UNITED STATES PATENT OFFICE.

WILLIAM AUGUSTUS WALKER, OF NEW YORK, N. Y., ASSIGNEE OF HENRY BALEN WALKER, DECEASED.

IMPROVEMENT IN SILVERING GLASS FOR MIRRORS AND REFLECTORS.

Specification forming part of Letters Patent No. 97,838, dated December 14, 1869; reissue No. 4,477, dated July 18, 1871.

*To all whom it may concern:*

Be it known that HENRY BALEN WALKER, of New York, in the county of New York and State of New York, did invent a certain new and Improved Mode of Silvering Glass for Mirrors and Reflectors and protecting the silvering on the glass; and I do hereby declare that the following is a full, clear, and exact description thereof.

To enable others skilled in the art to use his invention, I will proceed to describe its operation and construction in the formation of the chemical compounds and their use and application.

A chemical compound is formed composed of the following ingredients, to wit: 1st, twenty-four ounces of nitrate of silver; nineteen or twenty ounces of concentrated liquid ammonia. These are mixed together in a vessel and left to stand for twelve hours. Then add one hundred and twenty ounces of distilled water; mix thoroughly, and filter through paper. 2d, I form another compound composed of the following ingredients in the specified quantities, to wit: one ounce crystallized tartaric acid. Add to this eight ounces of distilled water. Let this stand for three or four months before using. Filter it through paper. 3d, take four and one-half ounces of the first solution or compound, to which add one ounce of the second solution or compound, and to which add twenty-two ounces of distilled water, when the compound is ready for use.

To prepare the glass for the silvering process, I cover the surface with a coat of whiting, rubbed on with a piece of flannel cloth, and afterward rubbed off with a piece of chamois-skin. Then apply a second coating of whiting, as before. Then polish it with a block covered with felt or fine French carpet, adding to the coat of whiting a small quantity of the oxide of iron or tin. After being polished the surface is washed with water and then rinsed with distilled water, when the glass is ready for silvering. The glass is then placed upon a cast-iron steam-table formed of a large iron box filled with water, through which several steam-pipes are passed, which, being filled with steam, generate a uniform heat upon the surface of the table upon which the glass rests, the heat being raised to about from 110° to 130°. After raising the temperature of the glass to the above degree of heat the last chemical compound or solution is poured upon the surface of the glass plate sufficient to spread over the entire surface, which it will readily do when being poured on. After the solution or compound has remained upon the glass half an hour, the silver having precipitated upon the glass, the surface is washed with distilled water and set to dry, when the silvering process is completed.

To protect the silvering thus put on, I proceed to cover it with a solution or compound of one ounce of shellac and ten ounces of ninety-five-per-cent. alcohol, over which I spread a coating or compound of red lead and litharge ground in oil, thus forming a mirror superior in luster and reflective power to those produced by the usual methods, and at a much less expense to manufacture.

It is obvious that the method of protecting the silver on the glass is applicable to those cases where the silver is deposited by other compounds or means as well as by that herein described; and it is also obvious that the shellac coating may be used alone, without the coating of red lead, litharge, and oil, especially on reflectors, mirrors, and similar articles which are to have their silvered surface covered in such a manner as to protect them from injury by handling or otherwise; and I so contemplate using the shellac coating in such cases. In other cases I propose to use both the shellac and the lead, litharge, and oil, applied as above described.

What is claimed as the invention of said HENRY BALEN WALKER is—

1. A mirror or reflector, consisting of any desired form of glass, having a silver coating applied thereto by the use of the silvering compounds, substantially as described.

2. A coating of shellac, dissolved in alcohol or its equivalent, applied to the silver coating for the purpose of protecting the same, as set forth.

3. The compound of litharge, red lead, and oil, applied as an outer coating, for protecting the silvering and the shellac coating, as set forth.

WILLIAM AUGUSTUS WALKER.

Witnesses:

GEO. W. WALKER,

M. P. WALKER.